Figure 4:
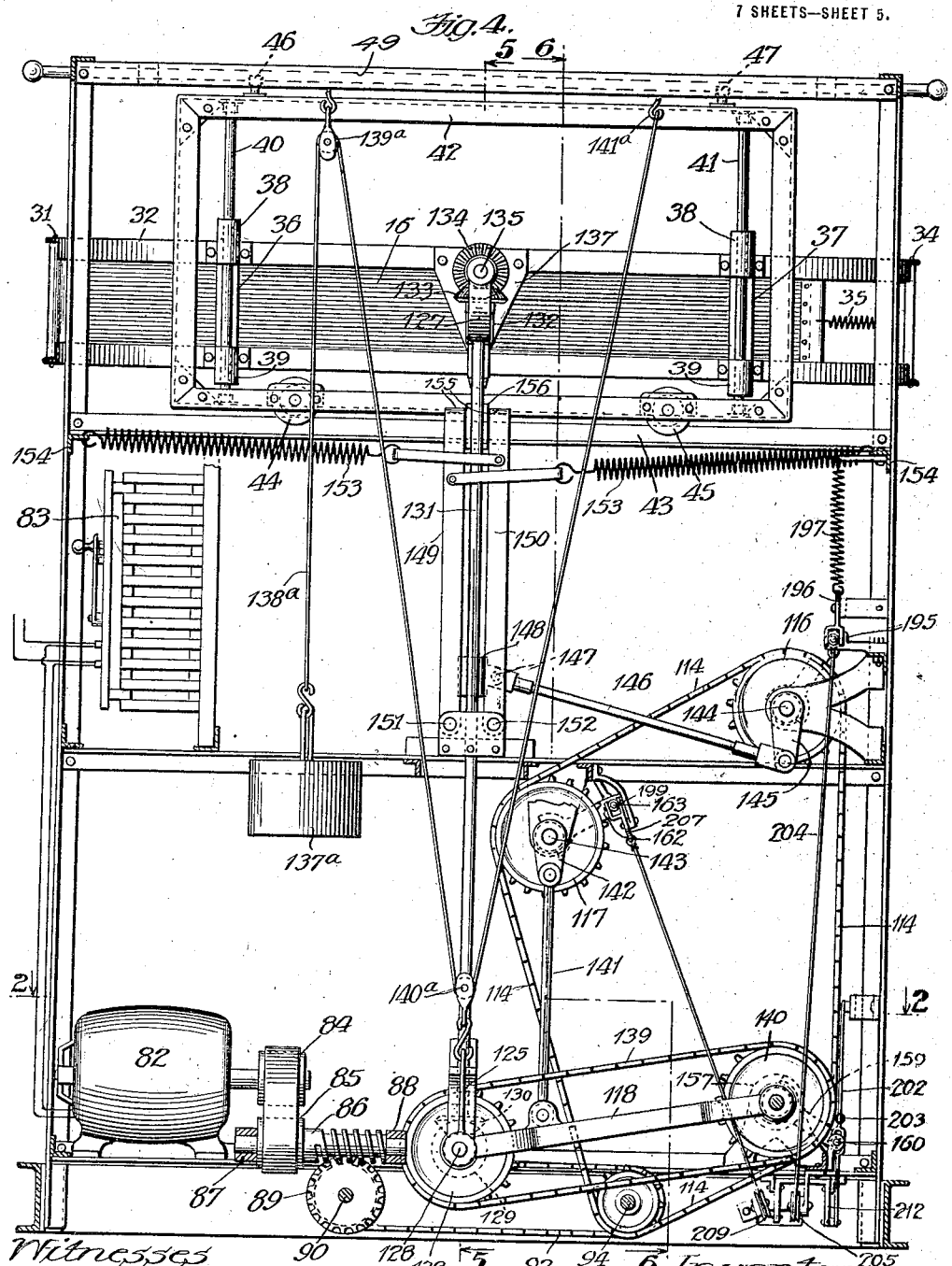

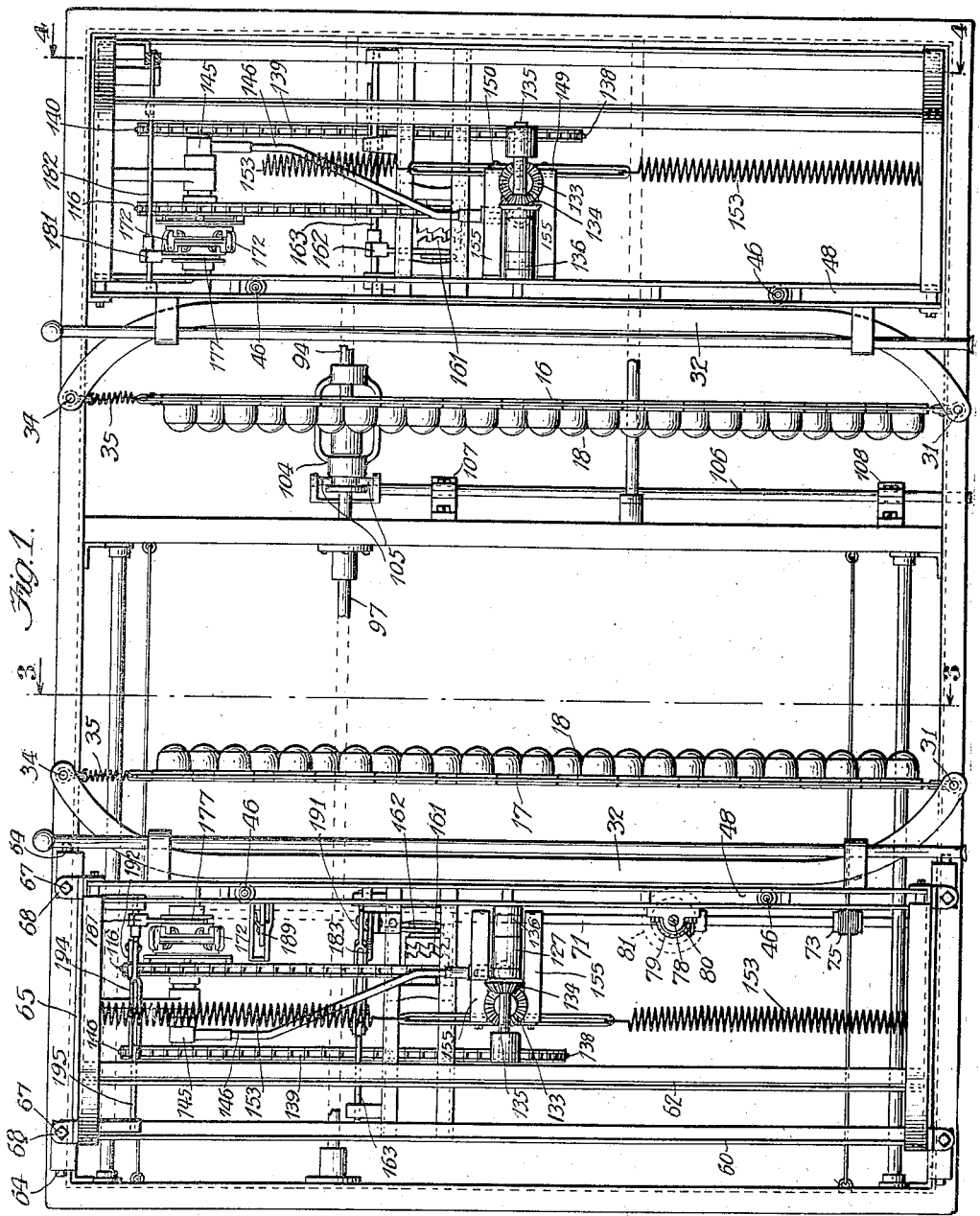

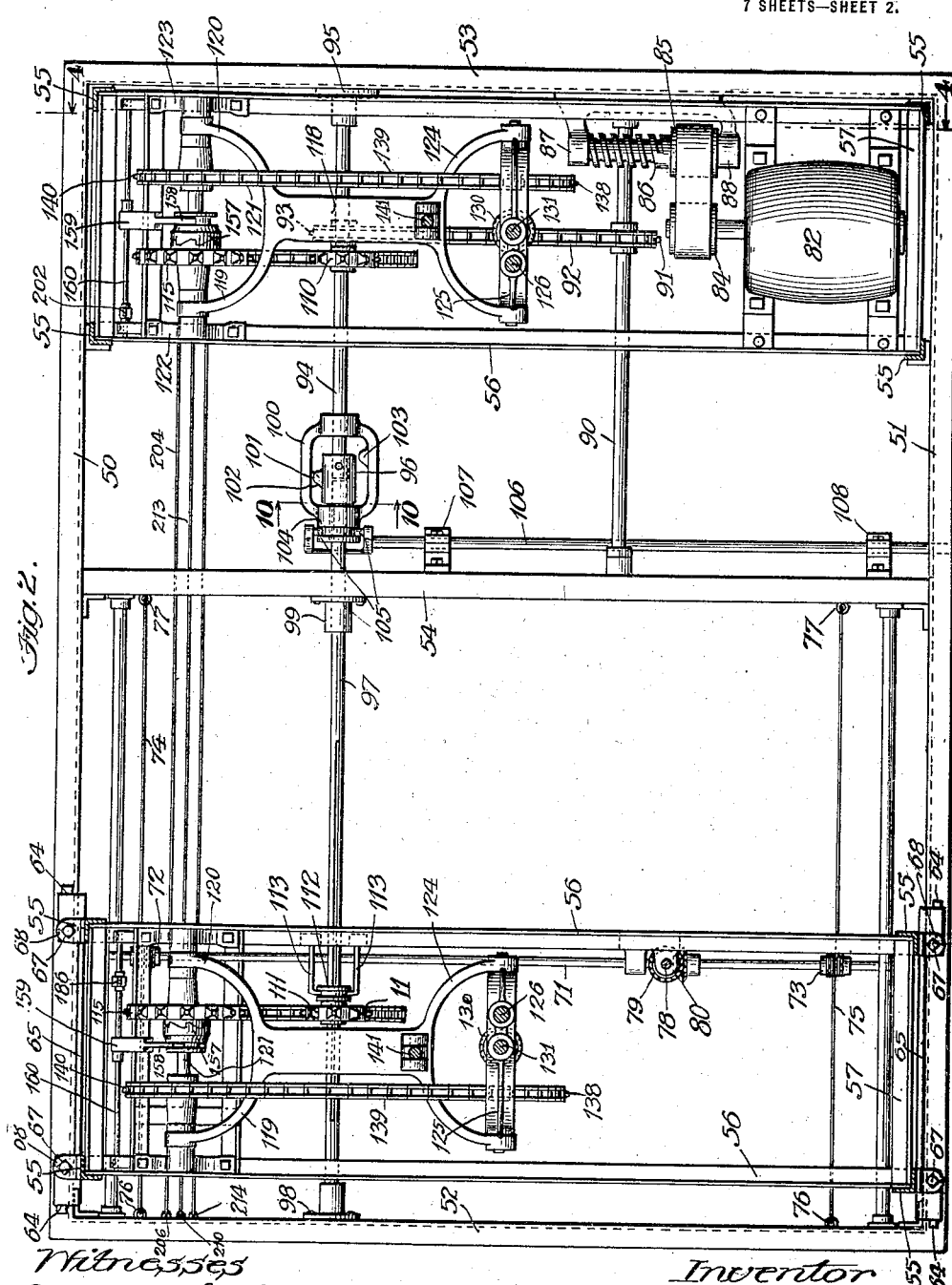

J. KERCHER.
MASSAGE DEVICE.
APPLICATION FILED AUG. 21, 1916. RENEWED FEB. 9, 1922.
1,429,594.
Patented Sept. 19, 1922.
7 SHEETS—SHEET 3.
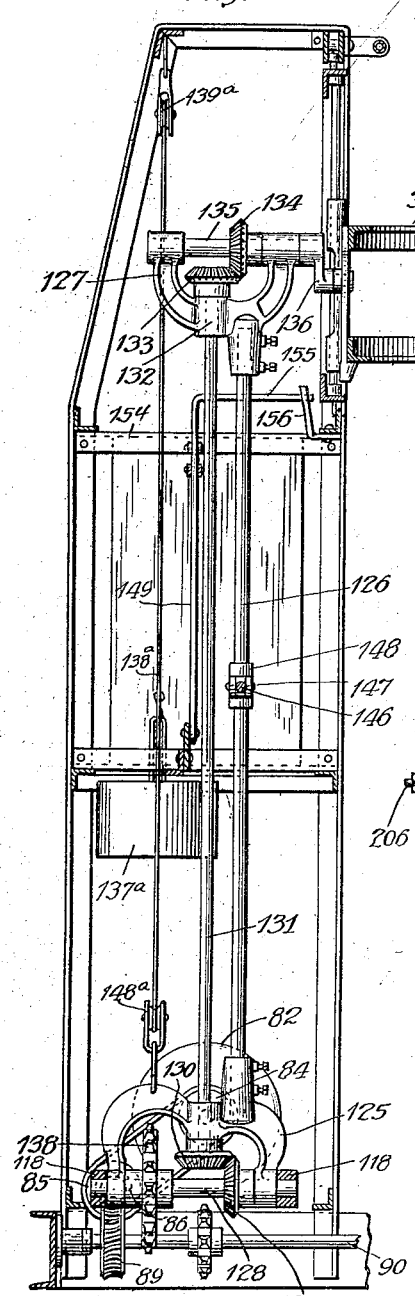
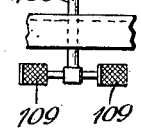
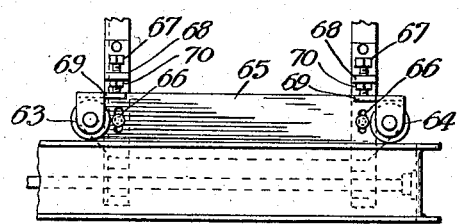
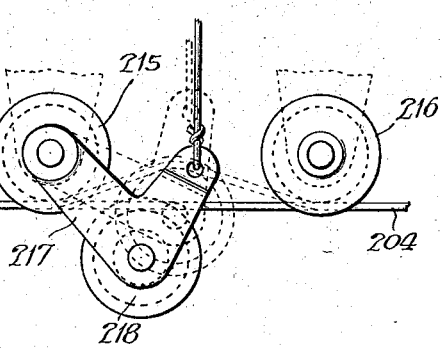
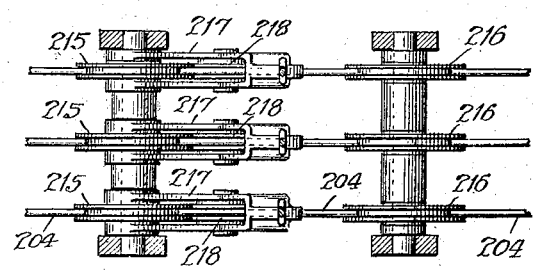

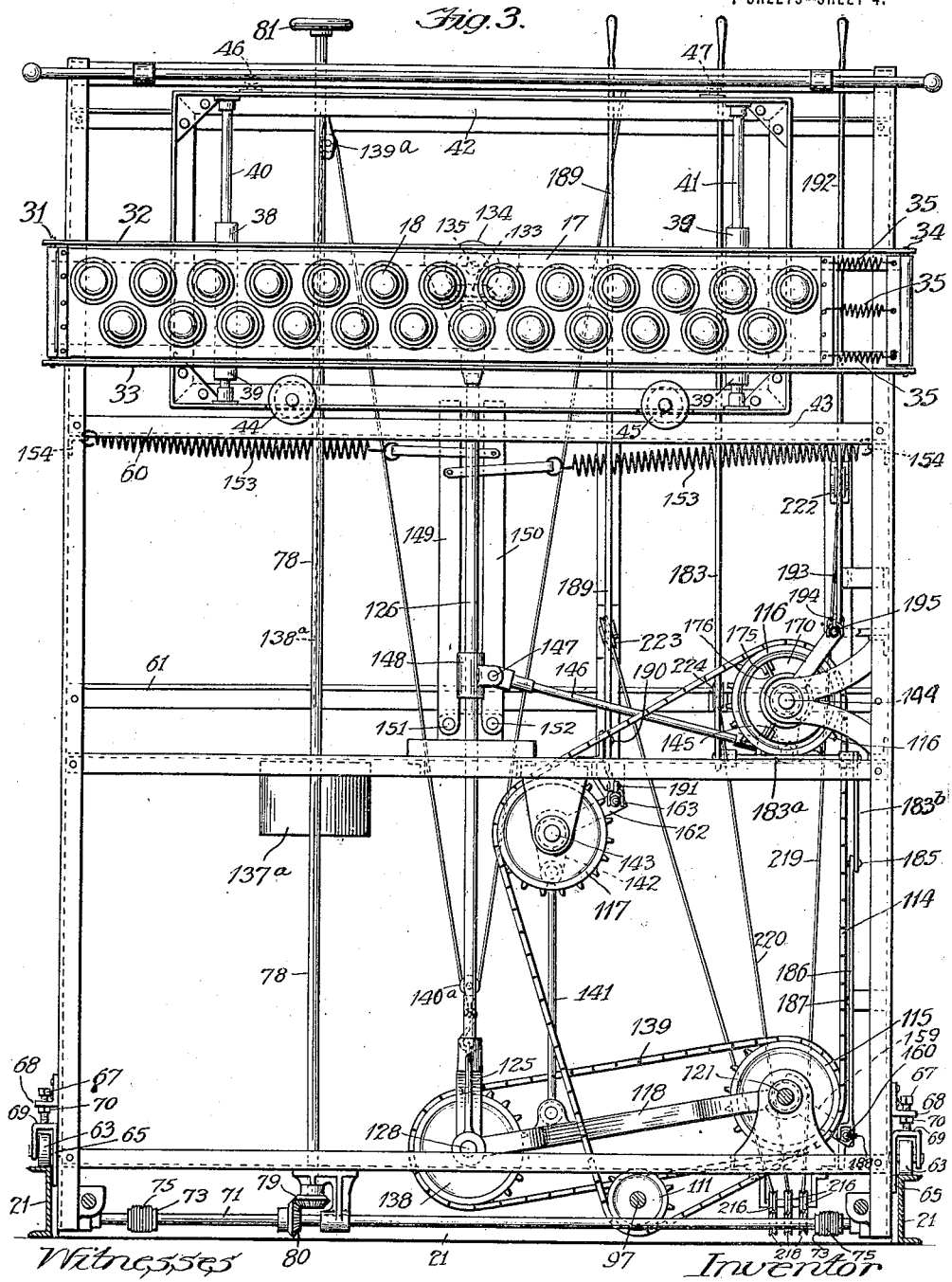

J. KERCHER.
MASSAGE DEVICE.
APPLICATION FILED AUG. 21, 1916. RENEWED FEB. 9, 1922.

1,429,594.

Patented Sept. 19, 1922.

7 SHEETS—SHEET 5.

Witnesses
Martin H. Olsen
Fidelis Maichen

Inventor
John Kercher
By Rector Hibben Davis & Macauley
his Attys

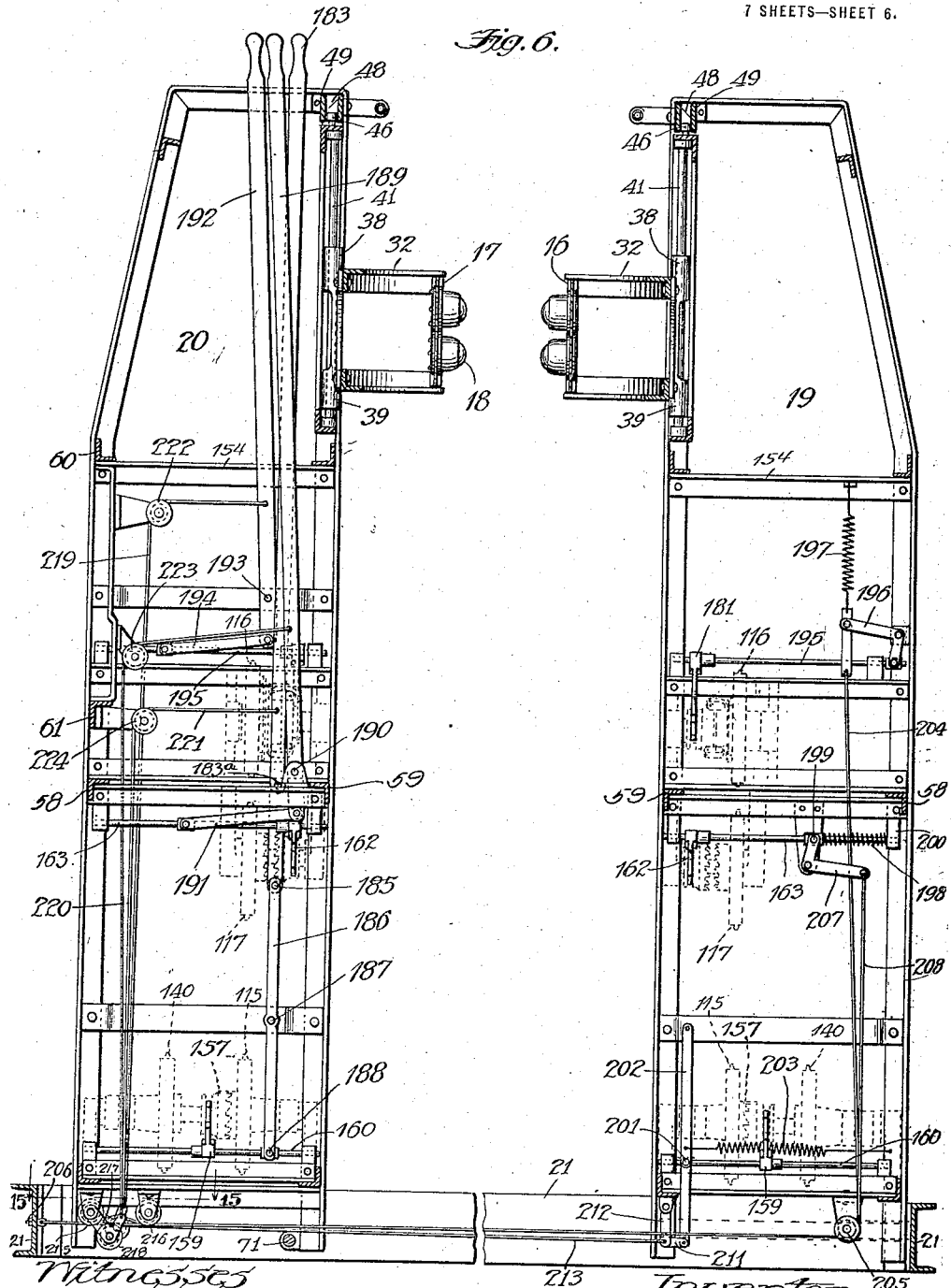

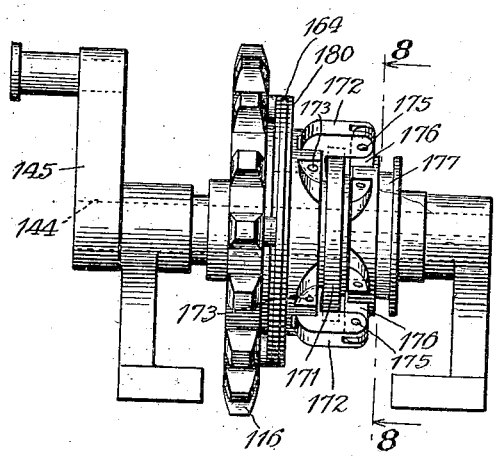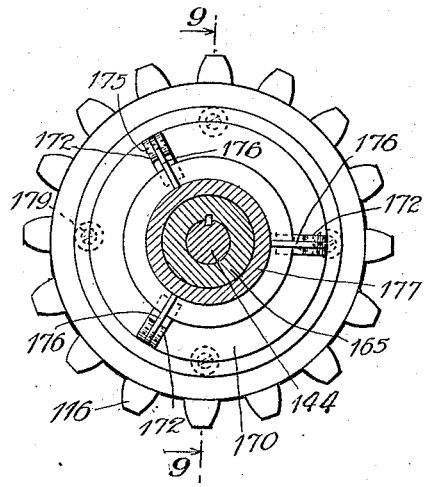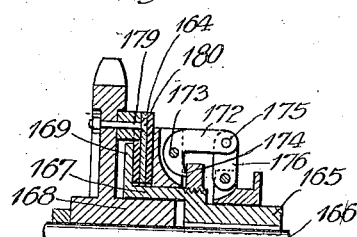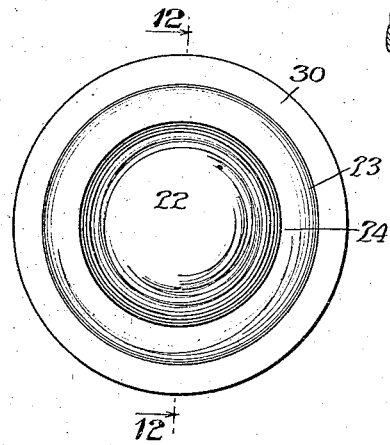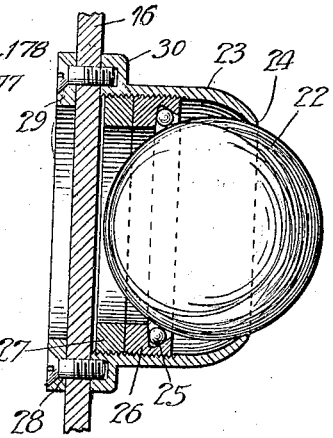

Patented Sept. 19, 1922.

1,429,594

UNITED STATES PATENT OFFICE.

JOHN KERCHER, OF CHICAGO, ILLINOIS.

MASSAGE DEVICE.

Application filed August 21, 1916, Serial No. 116,026. Renewed February 9, 1922. Serial No. 535,396.

*To all whom it may concern:*

Be it known that I, JOHN KERCHER, a citizen of the United States, residing at Chicago, in the county of Cook and State of Illinois, have invented certain new and useful Improvements in Massage Devices, of which the following is a specification.

My invention is more particularly adapted for massaging the abdomen and other parts of the trunk of the patient though it is also applicable to the limbs. The improved construction comprises a pair of broad opposed belts or aprons, each carrying a number of massaging instrumentalities, adapted to engage respectively opposite sides of the body to be massaged. The belts or aprons are so mounted and the device is so constructed that the belts may be adjusted toward and from each other according to the thickness of the body being massaged, and given a variety of motions corresponding substantially to the motions employed in hand massaging, the devices for controlling and selecting the particular motions to be given the belts being within easy reach and control of the subject. The patient is thus enabled to directly control the operation without physical exertion and without outside assistance.

In the accompanying drawings I have shown and in the following specification described in detail a preferred embodiment of my invention. It will be understood, however, that the specific disclosure is for the purpose of exemplification only, and that the scope of my invention is defined in the following claims in which I have endeavored to distinguish it from the prior art so far as known to me without, however, relinquishing or abandoning any portion or feature thereof.

In the drawings Fig. 1 is a plan view of the entire construction; Fig. 2 is a horizontal section on the line 2—2 of Fig. 4; Fig. 2ᵃ is a plan view supplemental to Fig. 2; Fig. 3 a vertical section on the line 3—3 of Fig. 1 looking in the direction of the arrows; Fig. 4 a similar section on the line 4—4 of Fig. 1 looking in the direction of the arrows; Fig. 5 is a vertical section on the line 5—5 of Fig. 4, parts being shown in elevation, looking in the direction of the arrows; Fig. 6 a vertical section on the line 6—6 of Fig. 4 looking in the direction of the arrows; Fig. 7 is an elevation of certain details of a clutch and connected mechanism forming a part of the preferred form of my invention; Fig. 8 a vertical section on the line 8—8 of Fig. 7; Fig. 9, a vertical section through the clutch on the line 9—9 of Fig. 8; Fig. 10 a vertical section on the line 10—10 of Fig. 2; Fig. 11 a face view of one of the massaging devices with which the belts are provided; Fig. 12 a vertical section thereof on the line 12—12 of Fig. 11; Fig. 13 a side elevation of a detail; Fig. 14 an elevation of a detail partly in vertical section; and Fig. 15 a horizontal section of the same detail with parts in elevation.

Each part is identified by the same reference character wherever it occurs throughout the several views.

The belts or aprons 16, 17 carrying the massaging devices 18 are mounted respectively on a stationary frame 19 and a movable frame 20, the former of which is fixedly secured to a rectangular base 21 adapted to rest upon a floor or similar support, and the latter slidably mounted on said base by sliding the movable frame towards and away from the stationary frame, the distance apart of the belts can be regulated according to the thickness of the person being treated (Figs. 1, 2 and 6). Each belt is mounted upon a carrier by which the belt may be reciprocated either vertically or horizontally or both, or give a substantially revolving or planetary motion. A motor and connections are provided whereby the motor may transmit the desired movements to the belts.

As the belts and their manner of mounting upon the respective frames are substantially identical, it will be sufficient for the present purpose to describe one of them, it being understood that the description applies to either. The belt is of sufficient width to carry a double row of the massaging devices to be presently described, and is made of canvas, leather or other flexible material. The massaging devices, which are shown on an enlarged scale in Figs. 11 and 12, consist primarily of balls 22 of metal, wood or suitable hard composition, which are so mounted on the belt that they may readily turn in any direction. For this purpose the balls are mounted in sockets 23, which are attached to the belts or aprons and beyond which the balls slightly project, the outer edges of the sockets as at 24, curving inwardly to form an opening of slightly less diameter than that of the ball. The ball is supported in the socket by a series of anti-friction balls 25, carried in a ball-race 26 screwed into the socket and held in position by a lock-nut 27. The socket is secured to the belt or apron by screws 28 passing through an annulus 29 in which the heads of the screws are counter-sunk, and also through the apron into threaded openings in the flange 30 of the socket. By means of this construction friction of the balls with the body against which they bear is avoided. These contact devices, as shown in Fig. 3, are arranged as closely together in two lines as the strength and flexibility of the belt will permit, and the belt is attached at one end to a rod 31, connecting an upper and a lower bow 32 and 33, the other end of the apron being connected to a similar rod 34 joining the other ends of the bows by several springs 35 (Fig. 3). Thus the apron maintains a yielding pressure upon the body into contact with which it is forced, and partially conforms itself to the contour thereof. The bows are connected together into a rigid frame not only by the rods referred to above, but also by bars 36, 37, (Fig. 4) and are provided respectively with sleeves 38, 39, which are mounted to slide upon vertical rods 40, 41, carried by a rectangular frame 42. By this means a vertical movement of the apron with reference to frame 42 is provided. Said frames are horizontally shiftable with reference to the frame 19, 20 upon which they are mounted, the supporting frame being formed with a horizontal track 43, upon which rollers 44, 45 journaled upon the horizontal shiftable frame run, and the upper member of said shiftable frame carries a pair of rollers 46, 47 mounted upon vertical spindles attached to said frame, said rollers being guided between parallel bars 48, 49 mounted upon the upper end of the supporting frame. See Fig. 6. By the construction just described, provision is made for a horizontal movement of the belt, and by such movement and the vertical movement to which reference has been made, a circular or planetary movement of the belt and the massaging devices carried thereby may be accomplished.

The particular construction of the frame work is obviously immaterial, but in the frame shown the base consists of relatively heavy U-beams, there being side members 50, 51, and end members 52, 53, and a cross-piece 54 intermediate the ends of the side members, all being formed of relatively heavy U-bars to provide a substantial base for the machine (Fig. 2). The structural work of the stationary and adjustable supporting frames 19, 20, is substantially the same, each comprising four corner posts 55 of angle iron, connected at the bottom by side and end bars 56, 57, and at suitable points by other horizontal angle irons 58, 59, 60, 61, 62, as well as by the bars 48, 49. The stationary supporting frame may be secured at one end of the base in any suitable manner. The adjustable supporting frame is carried upon the side bars or sills of the base by means of rollers 63, 64, carried upon adjustable end bars 65, which have pin and slot connections 66, 66, with the corner posts at the respective ends of the adjustable supporting frame, and may be adjusted relative thereto by screws 67, 67, extending through brackets 68, 68 on said corner posts, engaging stops 69, 69 on said cross-pieces 65 and locked in position by the lock nuts 70, 70 (Figs. 3 and 13). By this construction said supporting frame is readily movable toward and from the stationary supporting frame, and may be adjusted to a slight extent vertically as occasion may require.

In order to readily and evenly adjust said movable supporting frame, I journal therein a cross shaft 71, which is formed or provided at its opposite ends with spools or windlasses 72, 73, about which are coiled ropes or wires 74, 75 respectively, said ropes being connected at their respective ends 76, 77 to the adjacent end beam 52 of the base, and the intermediate cross piece 54 thereof (Figs. 2 and 3). Obviously by rotating the shaft 71 and the drums or windlasses thereon, the adjustable supporting frame may be moved toward and away from the stationary frame, and this rotation is effected by means of a vertical shaft 78 carrying at its lower end a bevel pinion 79, meshing with the similar pinion 80 upon the cross shaft, and at its upper end a hand wheel 81 by which it is turned.

The above described motions of the belts or aprons and the frames carrying the same, are transmitted thereto from an electric motor 82 which is mounted upon the stationary supporting frame, as shown and controlled by a rheostat 83 which is mounted upon said frame in any suitable position accessible to the subject, so that the latter may be able not only to turn the power off and on but control the speed of operation. The electric motor is belted at 84 to a pulley 85 on a worm shaft 86, which is mounted in suitable bearings 87, 88, on the frame, and drives a worm wheel 89 on a countershaft 90 (Figs. 2, 4). The latter also carries a sprocket wheel 91, which is connected by a sprocket chain 92 with a sprocket wheel 93 upon the longitudinal shaft 94, journaled at one end in a bearing 95 on said stationary supporting frame. To the other end of said shaft 94 is pinned a sleeve 96 in which the end of a coaxial shaft 97 is revolubly mounted, said shaft being journaled in the base at 98, and 99. A yoke 100 is keyed upon shaft 97 to turn therewith and embraces sleeve 96, being reciprocable longitudinally of shafts 94 and 97. The sleeve 96 has a lug 101 thereon and the yoke a pair of said lugs 102, 103 which are displaced with reference to each other longitudinally of the yoke so that when the yoke is in one extreme position relative to the sleeve, lug 101 engages lug 102, but when the yoke is in the other extreme position lug 101 engages lug 103 on said yoke. Therefore by shifting the yoke from one position to the other, shaft 94 may be given a half revolution with reference to shaft 97. It will appear below that the shafts 94 and 97 drive similar mechanisms on the stationary and adjustable supporting frames respectively, and it follows that by shifting the yoke and permitting a semi-revolution of the shaft 94 independent of the shaft 97, the relative phases of the two sets of mechanisms are displaced, and the belts may at will be caused to work either in the same or opposite directions. In order to shift the yoke it is formed with a grooved collar 104 which is engaged by pins 105, carried by an oscillating shaft 106, journaled at 107, 108 in the base of the machine, see Fig. 2, and provided at one end with a pair of pedals 109, see Fig. 2$^a$, by which the shaft may be oscillated and the position of the yoke reversed.

The shafts 94 and 97 are respectively provided with sprockets 110, 111, which are or may be identical except that the sprocket 110 is fixed to the shaft 94, and the sprocket 111 keyed to shaft 97 so that it is compelled to turn with the latter but is movable longitudinally thereon. In order that said sprocket may accompany the adjustable supporting frame 20 in its movement toward and from the stationary supporting frame, said sprocket is formed with a grooved collar 112, which is engaged by fingers 113 mounted upon the adjustable supporting frame.

Except in the respects above mentioned, the mechanisms of the stationary and adjustable supporting frames respectively are identical. It will therefore be sufficient for the present purpose to describe one of these mechanisms, it being understood that the description applies equally to the other. The sprocket 110 is used to drive the several mechanisms for giving the belt the motions to which reference has heretofore been made, and for this purpose is connected by a single chain 114 to sprockets 115, 116 and 117. The sprocket 115 is connected to the belt carrier by mechanism for giving the latter a circular or planetary motion; sprocket 116 is connected to the belt carrier for giving it a reciprocation in a horizontal plane, and sprocket 117 has the function of transmitting motion to the belt carriage for vertically reciprocating the same. I have heretofore referred to the fact that the belt carrier is mounted in the horizontally movable frame 42 by means of guides and sleeves which permit a vertical motion of the belt carrier and belt relative to said frame. The means for giving a vertical motion to the frame comprises an arm 118 (see Figs. 2, 3, 4) which is bifurcated at its opposite ends, the forks 119, 120 being pivoted upon the shaft 121, upon which the sprocket 115 is secured, and which is mounted in stationary bearings 122, 123 in the stationary supporting frame. (See Figs. 2 and 4.) The yoke or fork 124 at the free end of said arm is pivoted to a bifurcated casting 125 (Figs. 2 and 5), which in turn is connected by a thrust rod 126 with a cast yoke 127 secured to the upper end thereof. The casting 125 is formed with bearings for the shaft 128 by which it is pivoted to said arm, and said shaft carries a bevel pinion 129 which meshes with a similar pinion 130 upon the lower end of rotary shaft 131, the upper end of which is journaled at 132 in casting 127, and is provided with a bevel pinion 133. The latter engages a bevel pinion 134 upon a horizontal shaft 135, which is also journaled in the upper casting, and carries a crank arm 136, the outer end of which is pivoted in a plate 137 secured to the bows which carry the belt or apron. The shaft 128 is provided with a sprocket 138 by which it is driven through a chain 139 embracing a sprocket 140 secured to shaft 121, upon which the sprocket 115 heretofore mentioned is loosely journaled (Fig. 3). Thus by swinging the arm 118 the belts are vertically reciprocated through the thrust rod 126, and the connections of the upper casting to the belt carrier which has just been described. In order to counterbalance the weight of these reciprocating parts, I provide a weight 137$^a$ which is suspended from a cable 138$^a$ passing over a stationary pulley 139$^a$, and under a pulley 140$^a$ secured to the casting 125, and upward to an eye 141$^a$ secured to the frame. Thus the upward movement of the parts is assisted and the downward movement opposed by the suspended weight.

Moreover through the gearing described, comprising the sprocket wheel 138, shaft 128, bevel pinions 129, 130, rotary shaft 131, bevel pinions 133, 134, shaft 135 and arm 136, the belt carrier may be given a circular or planetary movement by reason of its sliding engagement with frame 42, and the capacity of the latter for horizontal movement. The arm 118 is oscillated when it is desired to give the belt an up and down movement by a pitman 141, which is pivoted to a crank arm 142 upon the shaft 143, on which the above mentioned sprocket wheel 117 is journaled.

In order to give the horizontal motion of the belt for which provision is made, the shaft 144 on which sprocket 116 is journaled, is provided with an arm 145, to which is pivoted a pitman 146, the other end of which is pivoted at 147 to a sleeve 148 upon the thrust rod 126 to which reference has been made. When shaft 144 is revolved, the crank arm and pitman connection with the thrust rod 126 gives the latter an oscillating motion about its pivotal connection with the arm 118, whereby the apron is reciprocated in a horizontal direction. It is desirable when no horizontal motion is to be given to the apron that the same be maintained in a substantially central position in the frame, and with this object in view I provide a pair of arms 149, 150 which are pivoted in the frame at 151, 152, and each drawn toward the other by a substantial spring 153 attached to the supporting frame at 154, and to said arm. The arms are bent into a substantially horizontal plane at their upper ends, as at 155, Fig. 5, and into engagement with the opposite sides of an intermediate stop 156, so that they are engaged by the thrust rod 126 whenever the latter moves substantially from its central position. Thus when the shaft 144 is rotated to horizontally reciprocate the belt, the arms 149 and 150 yield to permit such reciprocation, but tend to return the thrust rod and the belt to central position.

In order that the particular motion or combination of motions desired may be under the control of the subject, the sprockets 115, 116, 117 are loosely mounted upon their shafts as above described, but clutches are provided in each instance by which the shaft may be locked to the sprocket and caused to revolve therewith. The clutch by which sprocket 115 is locked to its shaft is an ordinary form of one-way clutch 157, see Fig. 2, which is formed as usually with a grooved collar 158, the groove of which is engaged by a finger 159 on a shifting rod 160. A similar clutch 161 is employed for connecting the sprocket 117 to its shaft, a finger 162 which engages the grooved collar on said clutch being mounted on the shifting rod 163, see Fig. 1.

A friction clutch is employed for connecting the sprocket 116 to its shaft, the details of the clutch being shown in Figs. 7 to 9 inclusive. The sprocket has an annular friction plate 164 mounted concentric therewith and at one side thereof, which is frictionally engaged by an element 165 keyed upon and movable longitudinally of the shaft 144, upon which said sprocket is loosely mounted. Said element is formed with a hollow hub 167 which slides over the hub 168 of the sprocket, and at its end adjacent said sprocket is formed with an exterior annular flange 169. A clamping ring 170 is mounted to slide upon the exterior of the hollow hub of the movable member between the annulus 164 of the sprocket wheel and a collar 171 threaded upon said hollow hub. A series of levers 172 shown as three in number, is pivoted at 173 to the clamping collar, each lever being formed with a hook-shaped extremity 174 to engage the ring 171, and a straight member or arm 175 which is connected by a link 176 with a grooved sliding collar 177 upon the reduced end 178 of the hollow hub. The annulus 164 is faced upon its opposite sides with suitable frictional material 179, 180 to engage flanges 169 and clamping ring 170. Obviously when the parts are in the position shown in Fig. 9, the annulus 164 with its anti-friction facings is clamped between a flange 169 and the clamping ring. But by moving the collar 177 away from the clutch the latter is released. In Figs. 1 and 6 is shown the finger 181 connected to the shifting rod 182 for shifting the clutch.

The means for controlling the clutch shifting mechanism just described is best shown in Fig. 6, in which certain parts of the mechanism are omitted and other parts shown in dotted lines for the sake of clearness. It is obviously desirable to shift the corresponding clutches upon the stationary and adjustable supporting frames respectively simultaneously. For this purpose I provide a series of handles upon the adjustable supporting frame and connect them more or less directly with the clutches upon the movable frame, and by means of flexible cables or the like with the clutches upon the stationary supporting frame. The hand lever 183 is pivoted to a shaft 183$^a$ which carries an arm 183$^b$ having a pin-and-slot connection with lever 186 (see Figs. 3 and 6), at 185. The latter is pivoted at 187 to the shifting rod 160 at 188 which rod carries a finger for shifting the clutch 157 as above described. The hand lever 189 is pivoted to the movable supporting frame at 190 and connected by link 191 to the shifting rod 163 above described by which clutch 161 on the movable frame is controlled. The hand lever 192 is pivoted to the movable supporting frame at 193 and connected by a link 194 with the shifting rod 195 upon the movable frame, by means of which the friction clutch for connecting the sprocket 116 to its shaft is controlled.

In order to provide for shifting the clutches on the stationary supporting frame irrespective of the position of the adjustable frame, I have provided the following means: Each of the shifting rods 195, 163 and 160 upon the stationary supporting frame is spring-pressed to normally hold its respective clutch in open position. Thus the rod 195 is connected to a bell-crank 196 and to a spring 197, the other end of which is secured to the frame. Rod 163 is surrounded by a spring 198 interposed between a collar 199 thereon, and an abutment 200 upon the frame, and shifting rod 160 is pivoted at 201 to an arm 202, which is urged by a spring 203 in a direction to maintain the clutch 157 on said stationary supporting frame in open position. A wire or cable 204 is attached to spring 197 and lever 196 controlling shifting rod 195 at one end and carried about an anti-friction roller 205, and secured at its opposite end as at 206 to an end member of the base frame. The shifting rod 163 is pivoted to a bell crank 207, the opposite end of which is connected by a cord or wire 208 extending over a similar pulley 209, and likewise connected at its other end as at 210 to the frame. The lower end of arm 202 is connected by a link 211 with an arm 212 which likewise is connected by a cord 213 with an eye 214 on the stationary frame. By examining Figs. 2, 4 and 6 it will be observed that the cords 204, 208 and 213 are parallel to each other and extend beneath the movable supporting frame. In order to exert the necessary pull upon the respective cords to secure the engagement of the proper clutch, I provide for each cord a pair of guide rollers 215, 216, (Figs. 6, 14 and 15) mounted beneath and upon the base of the movable supporting frame and spaced a suitable distance apart, and upon the bearings of roller 215 I pivot a bifurcated lever 217 carrying the roller 218 which, when said lever is swung upward, is adapted to engage its respective cord and form an angular bend therein, as shown in dotted lines in Fig. 14. Such levers are respectively connected to the hand levers on the movable supporting frame, which control the clutches upon said frame corresponding to the clutches upon the stationary frame which are operated by the cord affected. Thus the lever 217 which engages cord 204 for operating the friction clutch upon the stationary supporting frame, is connected by a cord 219 with lever 192 which operates the friction clutch upon the movable supporting frame, the lever which engages cord 208 is connected by cord 220 to the lever which operates rod 163 upon the movable supporting frame, and the lever which affects cord 213 is connected by cord 221 with lever 183 which operates the corresponding clutch 157 upon the movable supporting frame. Suitable pulleys 222, 223 and 224 are provided for securing the proper direction of the cords. Thus whatever the position or adjustment of the movable supporting frame, the operation of the handle by which one of its clutches is shifted causes a shift of the corresponding clutch upon the stationary supporting frame.

From the above description of the construction and operation of the machine it will be apparent that a variety of motions may be imparted to the aprons carrying the contact devices. They may be given a simple vertical, horizontal or circular motion or a motion compounded to either two of these motions, though for practical purposes it is not desirable to compound the vertical with the circular motion. Again, the aprons may be moved in the same direction at the same time or in opposite directions according to the position of the yoke 100. A single motor is used in connection with all the motions and the speed of operation and the character of the movement imparted to the massage aprons are within the control of the subject by a simple manipulation of the handles as heretofore described.

I claim:

1. In a device of the class described, a flexible apron, means at its ends for holding said apron under tension and giving it a horizontal movement substantially in the plane thereof, and a series of projections thereon adapted to be brought into contact with the body to be massaged.

2. In a device of the class described, a flexible apron, means at its ends for holding said apron under tension and giving it a horizontal movement substantially in the plane thereof, a series of spherical bodies mounted on the apron and having universal movement with reference thereto.

3. In a device of the class described, a flexible apron, means at its ends for holding said apron under tension and giving it a movement substantially in the plane thereof, a series of spherical bodies, socket members for supporting said spherical bodies upon the apron and anti-friction means between the sockets and the spherical bodies.

4. In a device of the class described, a pair of opposed flexible aprons each having a plurality of projections to engage the body to be massaged, a carriage for each apron, means at its ends for mounting the apron thereon under tension, and means for moving the carriage substantially parallel to the plane of the apron.

5. In a device of the class described, a pair of opposed flexible aprons each having a plurality of spherical projections to engage the body to be massaged, a carriage for each apron, means at its ends for mounting the apron thereon under tension, and means for reciprocating the carriage vertically.

6. In a device of the class described, a pair of opposed flexible aprons each having a plurality of projections to engage the body to be massaged, a carriage for each apron, means for mounting the apron thereon under tension, means at its ends for moving the carriage horizontally.

7. In a device of the class described, a pair of opposed flexible aprons each having a plurality of projections to engage the body to be massaged, a carriage for each apron, means for mounting the apron thereon under tension, and means for giving the carriage a circular movement parallel to the plane of the apron.

8. In a device of the class described, a pair of opposed flexible aprons each having a plurality of projections to engage the body to be massaged, a carriage for each apron, means for mounting the apron thereon under tension, means for reciprocating the carriage vertically and horizontally in a plane substantially parallel to the plane of the apron, and clutches for controlling the horizontal and vertical movement respectively.

9. In a device of the class described, a pair of opposed flexible aprons each having a plurality of projections to engage the body to be massaged, a carriage for each apron, means for mounting the apron thereon under tension, means for reciprocating the carriage horizontally in a plane substantially parallel to the plane of the apron, means for giving the carriage a circular movement in a plane substantially parallel to the plane of the apron, and clutches for controlling the horizontal and circular movement of the apron respectively.

10. In a machine of the class described, a base, a pair of supporting frames mounted on the base, one of which is adjustable toward and from the other, massaging devices carried by the respective frames, and means for oscillating the massaging devices.

11. In a device of the class described, a base, a pair of supporting frames, one of which is adjustable toward and from the other on the base, a frame horizontally reciprocable upon each said supporting frame, a carrier vertically reciprocable on each said horizontally reciprocable frame, massaging means mounted upon each said carrier, and means for operating the horizontally reciprocable frame and the vertically reciprocable carriage.

12. In a device of the class described, a supporting frame, a carrier mounted for vertical and horizontal reciprocation relative to said frame, an arm pivoted to said frame, a rod pivoted to said arm, and carrier respectively at its opposite ends, means for oscillating said arm about its pivotal connection to the frame, and means for oscillating said rod about its pivotal connection to said arm.

13. In a device of the class described, a supporting frame, a carrier mounted on said frame for vertical and horizontal reciprocation relative thereto, a massaging device carried by said carrier, a rod pivoted to said carrier at one end, a swinging arm to which said rod is pivoted at its other end, arms pivoted upon opposite sides respectively of the central position of said rod and stops to engage the same, springs attached to the respective arms and adapted to draw them towards each other and towards said rod, means for swinging said rod about its pivotal connection with the first said arm, and means for swinging said arm.

14. In a device of the class described, a supporting frame, a frame movable horizontally thereon, a carrier movable vertically upon the last said frame, an arm pivoted on the supporting frame, a rod pivoted to the carrier and to said arm, a transverse shaft, an arm thereon, and a pitman connecting said arm to the first said arm, a second transverse shaft, an arm thereon and a pitman connecting said arm to said rod, sprockets journalled on the respective shafts, clutches for locking the respective sprockets to their shafts, a third shaft, a sprocket thereon, means for driving said third shaft, and a chain connecting said sprockets whereby said carrier may be given a vertical or a horizontal motion or both.

15. In a device of the class described, a supporting frame, a carrier mounted thereon with provision for vertical and horizontal movement with respect thereto, massaging means on said carrier, means for actuating said carrier comprising the following elements; a shaft 121, means for driving the shaft, an arm 118 swiveled on said shaft, a shaft 128 journaled in the outer end of said arm, sprockets on the respective shafts, a sprocket chain connecting said sprockets, means for vibrating said arm, a rod 126 swiveled at its lower end on said shaft 128, a shaft 135 journaled in the upper end of said arm, a shaft 131 parallel to arm 126, pinions 129, 130 connecting shafts 128 and 131, pinions 133 and 134 connecting shafts 131 and 135, and arm 136 on shaft 135 pivoted at its outer end to said carrier.

16. In a device of the class described, a supporting frame, a carrier mounted for vertical and horizontal motion with respect to said frame, means for giving a circular motion to said carrier comprising shaft 135, bevel gear 134, and arm 136 connected to said carrier, a shaft 131 having a pinion 133 engaging pinion 134 and a pinion 130 on its lower end, a shaft 128 having a pinion 129 engaging pinion 130, an arm 118 in which said shaft 128 is journalled, said arm pivoted to the frame, a sprocket on shaft 128 for driving the same, a sprocket coaxial with the pivots of said arm, a chain connecting said sprockets, and means for driving the last said sprocket.

17. In a device of the class described, a frame, a carrier having a vertical and a horizontal movement with respect to said frame, means for giving a combined reciprocating and circular motion to the carrier comprising an arm 118, and a sprocket 140 coaxial with said arm, means for driving the sprocket, a shaft 128 journalled on said arm, a sprocket 138 on said shaft, a rod 126, a casting 125 connecting said rod to shaft 128, a casting 127 secured to the upper end of said rod, a radius shaft 131 journalled in said castings, a bevel pinion 130 on said shaft meshing with the bevel pinion 129, and a pinion 133 thereon, a shaft 135 journalled in the casting 127, an arm 136 on said shaft having an eccentric pin engaging the carrier, and a pinion 134 on shaft 135 engaging the pinion 133.

18. In a machine of the class described, a supporting frame, a carrier mounted on said frame with provision for vertical and horizontal reciprocation relative thereto, an arm 118 pivoted on the frame, a shaft 128 on the outer end of said arm, a sprocket 138 on said shaft, a sprocket 140 concentric with the pivot of said arm, a chain connecting said sprockets, a bevel pinion 129 on shaft 128, a casting 125 pivoted on shaft 128, a rod 126 connected to said casting, an upper casting 127 on said rod, a shaft 135 in the upper casting, a crank 136 on said shaft engaging the carrier, a bevel pinion 134 on said shaft, a radius shaft 131, a pinion 133 on said shaft engaging pinion 134 and a pinion 130 on said shaft engaging pinion 129, a shaft 143, means for rotating said shaft, a connection from said shaft to arm 118 for raising and lowering the latter, a shaft 144, connections from said shaft to rod 126 for swinging the latter to impart horizontal movement to the carrier, a sprocket 117 on shaft 143, a sprocket 116 on shaft 144, a sprocket 115 on the shaft of sprocket 140, a driving shaft 94 having a sprocket thereon, and a chain 114 connecting sprockets 115, 116, 117 and the sprocket on shaft 94.

19. In a machine of the class described, a base, a stationary supporting frame and a movable supporting frame adjustable towards and from said stationary frame, carriers vertically and horizontally movable in the respective supporting frames, mechanisms for giving vertical and horizontal reciprocating motions respectively to said carriers, each comprising a clutch, hand levers on the movable supporting frame for shifting the respective clutches, means for shifting the respective clutches on the stationary frame, each comprising a cord connected at one end to the base adjacent the movable supporting frame, and means connected to the respective levers for putting a tension upon said cords to operate the clutches upon the stationary frame corresponding to the clutches operated by the respective levers upon the adjustable supporting frame.

20. In a machine of the class described, a base, a stationary supporting frame and a movable supporting frame mounted upon the base, carriers vertically and horizontally movable in the respective supporting frames, mechanisms for giving different movements to said carriers on each of said supporting frames, a motor, connections between said motor and said mechanisms for actuating the latter, comprising a clutch for each mechanism, shifting means for the several clutches on the movable frame, each comprising a hand lever, shifting mechanisms for the several clutches on the stationary frame, each comprising a means for automatically moving the clutch in one direction, a cable so attached to the clutch and guided on the frame as to move the clutch in the other direction when the cable is put under tension, the cable extending adjacent to the movable frame and attached to its other end to the base, and means connected to its respective hand lever for flexing said cable.

21. In a machine of the class described, a base, a stationary supporting frame and a movable supporting frame mounted upon the base, carriers vertically and horizontally movable in the respective supporting frames, mechanisms for giving different movements to said carriers on each of said supporting frames, a motor, connections between said motor and said mechanisms for actuating the latter comprising a clutch for each mechanism, shifting means for the several clutches on the movable frame, each comprising a hand lever, shifting mechanisms for the several clutches on the stationary frame, each comprising a means for automatically moving the clutch in one direction, a cable so attached to the clutch and guided on the frame as to move the clutch in the other direction when the cable is put under tension, the cable extending adjacent to the movable frame and attached to its other end to the base, a pair of guide pulleys on the moveable frame for each cable, and a lever connected to a hand lever for flexing the cable intermediate the pulleys.

22. In a device of the class described, a pair of aprons each having contact devices thereon, carriers for the respective aprons, supporting frames for the respective carriers, mechanism on each frame for giving the carrier thereon a motion parallel to the plane of its apron, a pair of shafts arranged end to end for driving the respective mechanisms, and each having a limited rotation independently of the other, means for driving one of said shafts and a connection between the shafts by which one may be driven from the other or a partial rotation of one with reference to the other is permitted.

JOHN KERCHER.